United States Patent [19]

Greene et al.

[11] Patent Number: 5,549,864
[45] Date of Patent: Aug. 27, 1996

[54] PROCESS FOR DECURLING A STRIP OF PHOTOSENSITIVE MATERIAL

[75] Inventors: William J. Greene, Webster; Robert J. Matoushek, Rochester; Harry A. Gorman, Rochester; John G. Weigand, Churchville, all of N.Y.

[73] Assignee: Eastman Kodak Company, Rochester, N.Y.

[21] Appl. No.: 430,640

[22] Filed: Apr. 28, 1995

Related U.S. Application Data

[62] Division of Ser. No. 228,065, Apr. 14, 1994.

[51] Int. Cl.⁶ .................................................. B29C 53/18
[52] U.S. Cl. ...................... 264/280.000; 226/1; 264/285
[58] Field of Search ................................. 264/280, 285; 226/1

[56] References Cited

U.S. PATENT DOCUMENTS

| | | |
|---|---|---|
| 2,012,953 | 9/1935 | Brunner et al. .......................... 162/271 |
| 2,620,285 | 12/1952 | Rose . |
| 2,893,053 | 7/1959 | Powell . |
| 3,916,022 | 10/1975 | Potter . |
| 4,141,735 | 2/1979 | Schrader et al. . |
| 4,474,832 | 10/1984 | Shirahata et al. . |
| 4,892,689 | 1/1990 | VanCappellen et al. . |
| 4,892,994 | 1/1990 | Tsuchiya et al. . |
| 4,933,693 | 6/1990 | Beach . |
| 4,935,605 | 6/1990 | Yasunaga et al. . |
| 4,952,960 | 8/1990 | Kosugi et al. . |
| 4,994,214 | 2/1991 | Stevens et al. . |
| 5,076,977 | 12/1991 | Maier et al. . |
| 5,128,236 | 7/1992 | Beighle et al. . |
| 5,138,026 | 8/1992 | Miyasaka et al. . |
| 5,277,108 | 1/1994 | Akamatsu et al. .................. 100/93 RP |
| 5,325,144 | 6/1994 | Yoshikawa et al. ..................... 354/319 |

FOREIGN PATENT DOCUMENTS 4-099448   4/1992   Japan .

Primary Examiner—Leo B. Tentoni
Attorney, Agent, or Firm—Frank Pincelli

[57] ABSTRACT

A method and apparatus for transporting and/or decurling a strip of photosensitive material. The apparatus includes a plurality of rollers and a drum. A belt is wrapped about the plurality of rollers and are positioned such that the belt forms a receiving pocket for holding and retaining the drum and for rotating the drum about its axis. At least one of the plurality of rollers being connected to a drive mechanism so as to move the belt about the rollers so as to cause the drum to rotate about its axis of rotation. The belt is in direct contact with the outer surface of the drum for a predetermined distance about the circumference of the drum forming a first film path. The first film path has an entrance for receiving film and an exit for allowing film to leave the film path. A heater may be provided which is associated with the heating drum for heating the drum to a predetermined temperature.

3 Claims, 7 Drawing Sheets

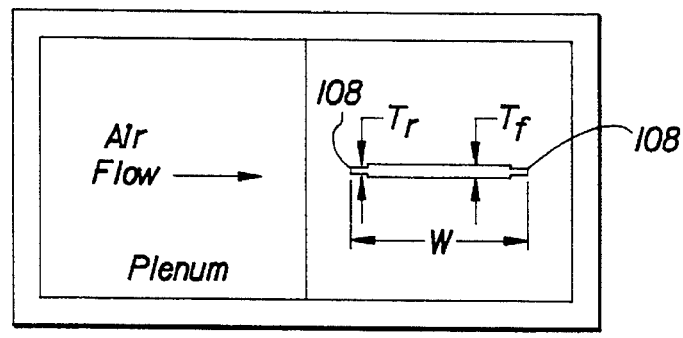
Fig.8
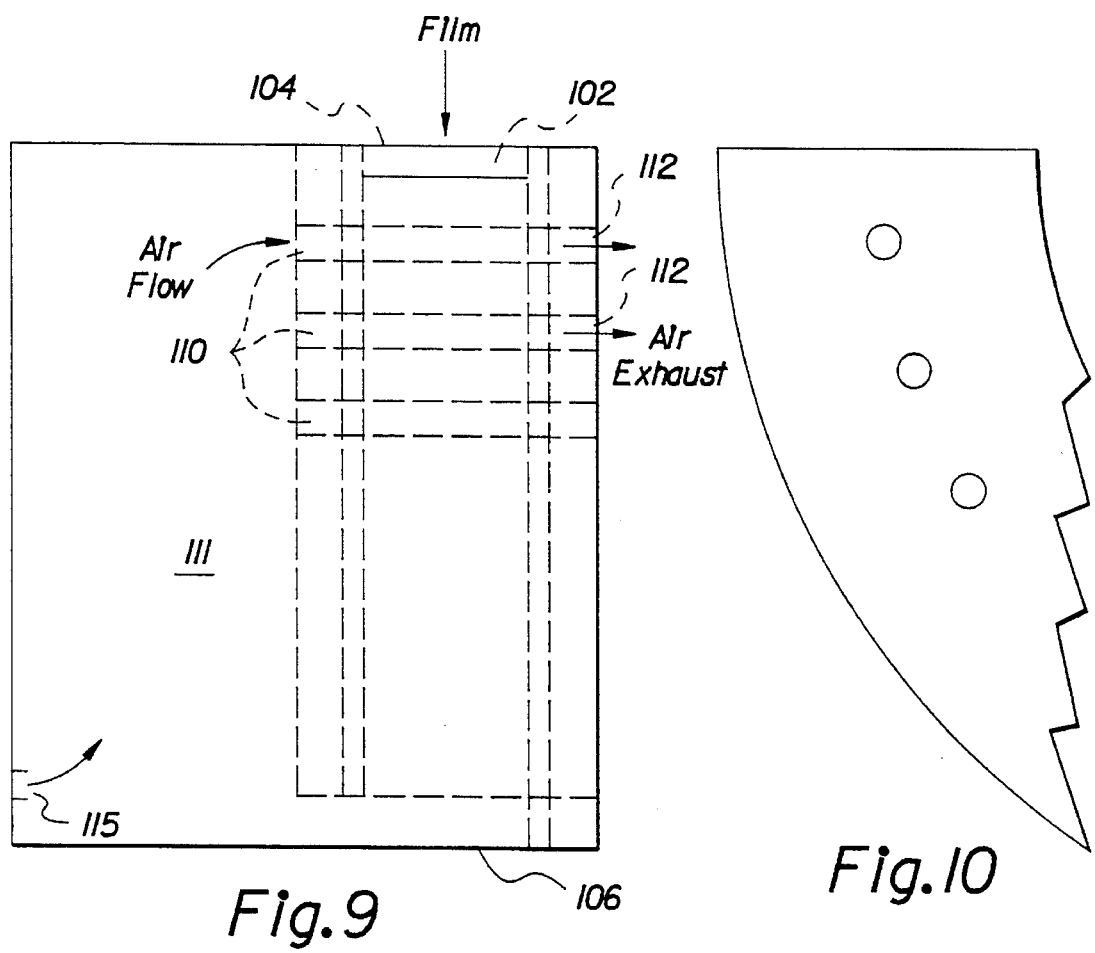
Fig.9
Fig.10

PROCESS FOR DECURLING A STRIP OF PHOTOSENSITIVE MATERIAL

This is a Divisional of application Ser. No. U.S. Pat. No. 228,065, filed Apr. 14, 1994

FIELD OF THE INVENTION

The present invention relates generally to equipment for handling exposed photographic filmstrips during photofinishing, including a method and apparatus for transporting the filmstrip in photofinishing equipment and for decurling the filmstrip.

BACKGROUND OF THE INVENTION

In typical 35 mm film cartridges, the filmstrip is withdrawn by its "film leader" from the cartridge and advanced past a rectangular exposure window or space gate and wound up on a take up reel until all potential image frames of the filmstrip are exposed. More recently there has been introduced, "thrust" cartridges, wherein the filmstrip may be advanced out of the light trapping slit or mouth of the cartridge shell by rotating the cartridge spool in an unwinding direction as is described in commonly assigned U.S. Pat. No. 4,933,693, incorporated herein by reference in its entirety. In use, the thrust cartridge may be loaded in a camera without an exposed leader protruding from the shell slit and advanced, after the camera film loading door is closed, by motorized drive mechanism until the first image frame is positioned for exposure. The thrust cartridge avoids any unnecessary waste of film leader and initial frames on loading into the camera. Moreover, it is contemplated that developed negative filmstrips may be returned to the customer wound back into the cartridge for safekeeping. In any case, the filmstrip is automatically or mechanically rewound into the film cartridge of either type upon exposure of all image frames, and the cartridge is rewound for processing and printing or mounting, in the case of positive film.

Before the filmstrip is completely exposed, it may reside tightly wound in the cartridge or partially unwound within the camera for a period of time and under varying conditions of temperature and humidity such that the filmstrip takes a "core set affecting the degree to which the film curls back upon itself when unrestrained". When filmstrip is originally manufactured and cut to length it is generally fairly limp and relatively easy to maintain straight (because it is wound on a relatively large diameter core maintained at a 50–60% relative humidity). After winding onto the spool of the film cartridge, the innermost layers of the filmstrip around the spool take on a higher degree of curl (given the relatively smaller diameter) then the outermost layers and the degree of curl becomes more pronounced with the passage of time and exposure to elevated temperature and/or low humidity. Moreover, with use of the thrust cartridges to store developed film, core set film curl may become more likely and more pronounced with the passage of time and be more apparent when prints are re-ordered from the aged filmstrip. This is particularly true if the spool diameter is small and the film base is thin, relative to the thickness of the emulsion layers, in order to miniaturize dimensions of the cartridge. Additionally, the material from which the film base is made can significantly affect the film's ability to take a core set. In particular, film having a PET (polyethylene terephthalate) base has been found to be very susceptible to core set.

Thus, the degree of core set film curl and its frequency of occurrence varies considerably due to its type, age, and environment to which it has been exposed in use and storage. This inconsistent core set film curl may make it difficult for photofinishing equipment to handle the film during splicing, processing and printing or mounting. In certain photofinishing operations, individual filmstrips are withdrawn or advanced from the film cartridge and passed through developing and fixing baths during processing, wherein the transport mechanism does not restrain the free end of the filmstrip. A number of film based materials absorb fluids in the bath become more limp when they are first withdrawn from the cartridge. Other film based materials are more hydrophobic, and the excess film curl, particularly the more hydrophobic filmstrips, may cause film to roll up or be folded back upon itself and be damaged as it sticks together or may jam film transporting mechanisms in the processing, splicing, printing or mounting equipment. The film handling the characteristics of the transporting mechanism may vary widely and are typically preset or configured to accommodate an "average" film curl and are not readily adjustable. There is a high probability that the film will be damaged if the device does not properly account for the curl present in the film. Thus, the equipment must be monitored and halted if a malfunction occurs.

One solution to the problem would be to subject all filmstrips to decurling operations upon withdrawal from the filmstrip cartridge and prior to processing, printing or mounting. It is known that sheet material may be decurled by passing the sheet over a sharp radius. This process is highly undesirable for use with film due to the possibility of severely damaging the film an/or image thereon. In order to make decurling of all filmstrips commercially feasible, the device must be reliable, low cost and easy to use without inflicting any adverse damage to the filmstrip. Japanese Patent Application No. P4099448 discloses heating of the filmstrip about a roller in a direction opposite the curl and heating the filmstrip above its glass transition temperature. Heating of the filmstrip to such temperatures present a high risk of causing sensitometric damage to the film. Additionally, the cooling provided is not very controlled.

Applicants have invented a decurling device and method of transporting the filmstrip which does so in a compact and efficient manner which is reliable, relatively low cost and does not require any significant controls.

SUMMARY OF THE INVENTION

In one aspect of the present invention there is provided a method and apparatus for decurling a strip of photosensitive material. The apparatus comprising:

a heating drum having an outer contact surface and an axis of rotation about which the heating drum can rotate;

a plurality of rollers associated with the heating drum;

a belt wrapped about the plurality of rollers, the rollers being positioned such that the belt forms a receiving pocket for holding and retaining the drum and for rotating the drum about its axis, at least one of the plurality of rollers being connected to a drive mechanism so as to move the belt about the rollers so as to cause the drum to rotate about its axis of rotation, the belt being in direct contact with the outer surface of the drum for a predetermined distance about the circumference of the drum and forming a first film path, the first film path having an entrance for receiving film and an exit for allowing film to leave the film path; and a heater associated with the heating drum for heating the drum to a predetermined temperature.

In another aspect of the present invention there is provided a method and apparatus for moving a filmstrip along a film path. The apparatus comprising:

- a drum having an outer contact surface and an axis of rotation about which the drum can rotate;
- a plurality of rollers associated with the drum; and
- a belt wrapped about the plurality of rollers, the rollers being positioned such that the belt forms a receiving pocket for holding and retaining the drum and for rotating the drum about its axis, at least one of the plurality of rollers being connected to a drive mechanism so as to move the belt about the rollers so as to cause the drum to rotate about its axis of rotation, the belt being in direct contact with the outer surface of the drum for a predetermined distance about the circumference of the drum and forming a first film path, the first film path having an entrance for receiving film and an exit for allowing film to leave the film path.

BRIEF DESCRIPTION OF THE DRAWINGS

Other objects, advantages and features of the present invention will become apparent from the following specification when taken in conjunction with the complete drawings in which like elements are commonly enumerated and in which:

FIG. 8 is a front elevational view of the drier of apparatus of FIG. 8;

FIG. 9 is side elevational view of the drier of FIG. 8; and

FIG. 10 is a end view of the drier of FIG. 9.

DETAILED DESCRIPTION OF THE INVENTION

Figure 1:
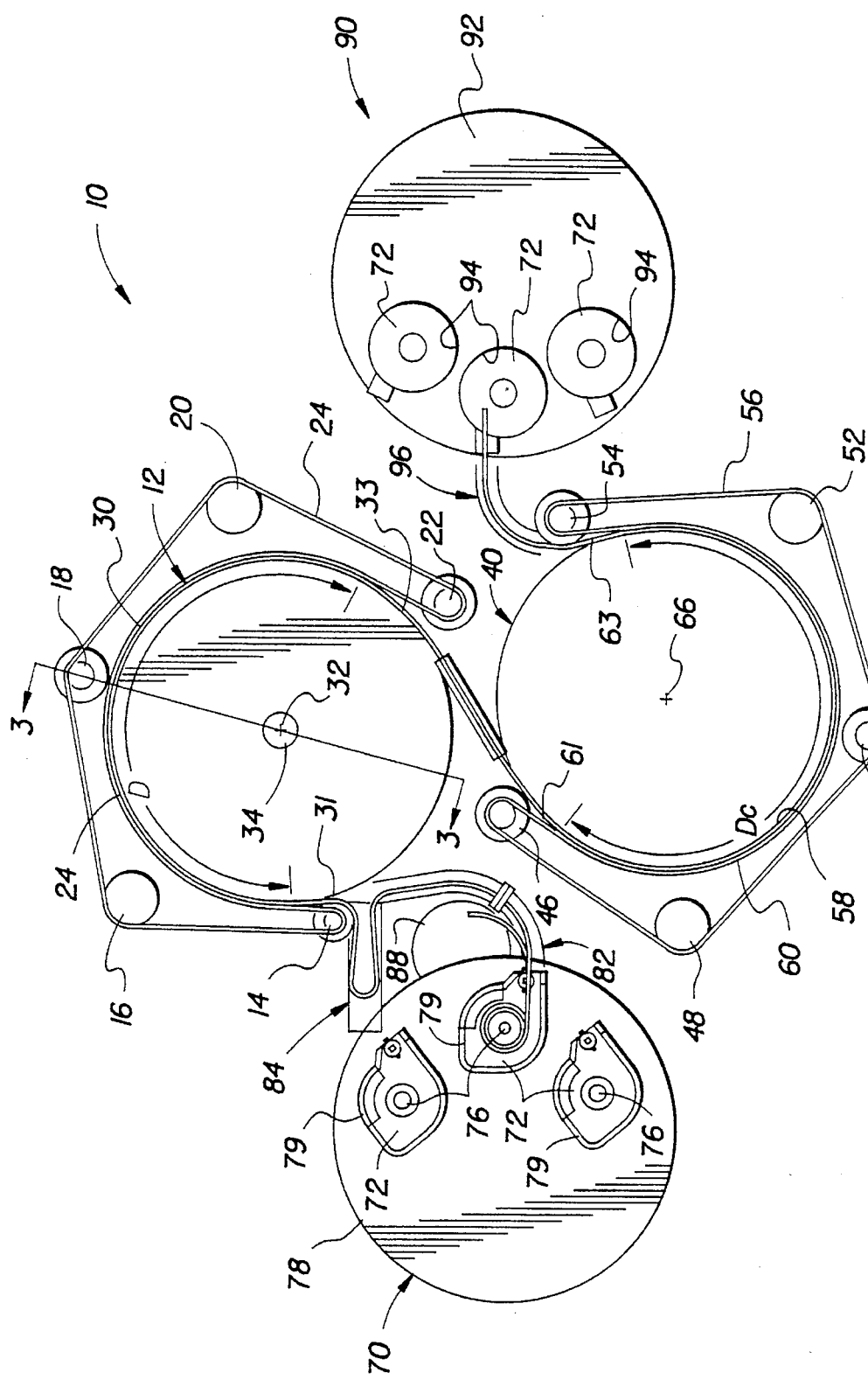
FIG. 1 is a schematic diagram of a transport and decurling apparatus made in accordance with the present invention.

Referring to FIG. 1 there is illustrated a mechanism for transporting and decurling a filmstrip. The apparatus/mechanism 10 may be part of a piece of photofinishing equipment or may be a separate piece of equipment which can be used in conjunction with photofinishing equipment. The mechanism 10 includes a cylindrical hollow heating drum 12 and a plurality of rollers 14,16,18,20,22 positioned at predetermined locations about the frame (not shown) of the mechanism 10. A continuous drive belt 24 is wrapped about the rollers 14,16,18,20,22 and forms a receiving pocket 26 for holding the cylindrical hollow heating drum 12. A portion of the continuous belt 24 is in direct and intimate contact with the outer surface 28 of the cylindrical hollow heating drum for predetermined circumferential distance D so as to form a first film path 30 having an entrance 31 and exit 33. In the particular embodiment illustrated the belt 24 is in contact with the drum 12 for a circumferential distance D of approximately 275°. However, it is to be understood that the distance D may be varied as desired. In the preferred embodiment illustrated the belt 24 includes a pair of step portions 25, one at each lateral end of the belt 24, for spacing the belt 24 from the emulsion surface of the film a distance d. In the particular embodiment illustrated the step portions 25 have a thickness t of about 0.020 inches (0.0508 cms) and the film has a thickness of about 0.005 inches (0.0127 cms).

The drum 12 preferably has a small undercut section 27 in the area below the central area of the film. As is best illustrated by reference to FIG. 2, undercut section 27 has a thickness $t_d$ of about 0.020 inches (0.0508 cms) and has a width smaller than the width of the film. The undercut section 27 minimizes the amount of dirt and/or contamination that will passed from the drum on to the film.

At least one of the rollers 14,16,18,20,22 is connected to a drive mechanism, not shown, for rotating of the roller about its rotational axis. In the particular embodiment illustrated roller 14 is a drive roller and the remaining rollers 16–22 are idler rollers. The rollers 14–22 are positioned such that a predetermined amount of tension is provided in the belt 24 such that when roller 14 is rotated, the belt 24 is moved about the roller which will in turn cause the drum 12 to rotate about its axis 32. The rollers 12–22 may be made of steel, plastic, rubber, or other desired material. Preferably all of the rollers are crowned so that the drive belt 24 will track about the plurality of rollers 14–22. In the particular embodiment illustrated, rollers 14,16,18 are steel rollers and are crowned in the central area. Rollers 16 and 20 are made up of plastic material. If desired, appropriate belt tensioning means, not shown, may be provided for maintaining tensioning of the belt so that appropriate contact is imparted to the cylindrical hollow heating drum 12. An appropriate control mechanism, not shown, is provided for controlling the operation of the motor used to rotate drive roller 14 such that the cylindrical heating drum 12 is rotated about its axis 32. The use of rollers and a continuous belt to hold and drive the drum provides for a system that requires low manufacturing tolerances and is thus easy and low cost to manufacture and assemble.

Figure 2:
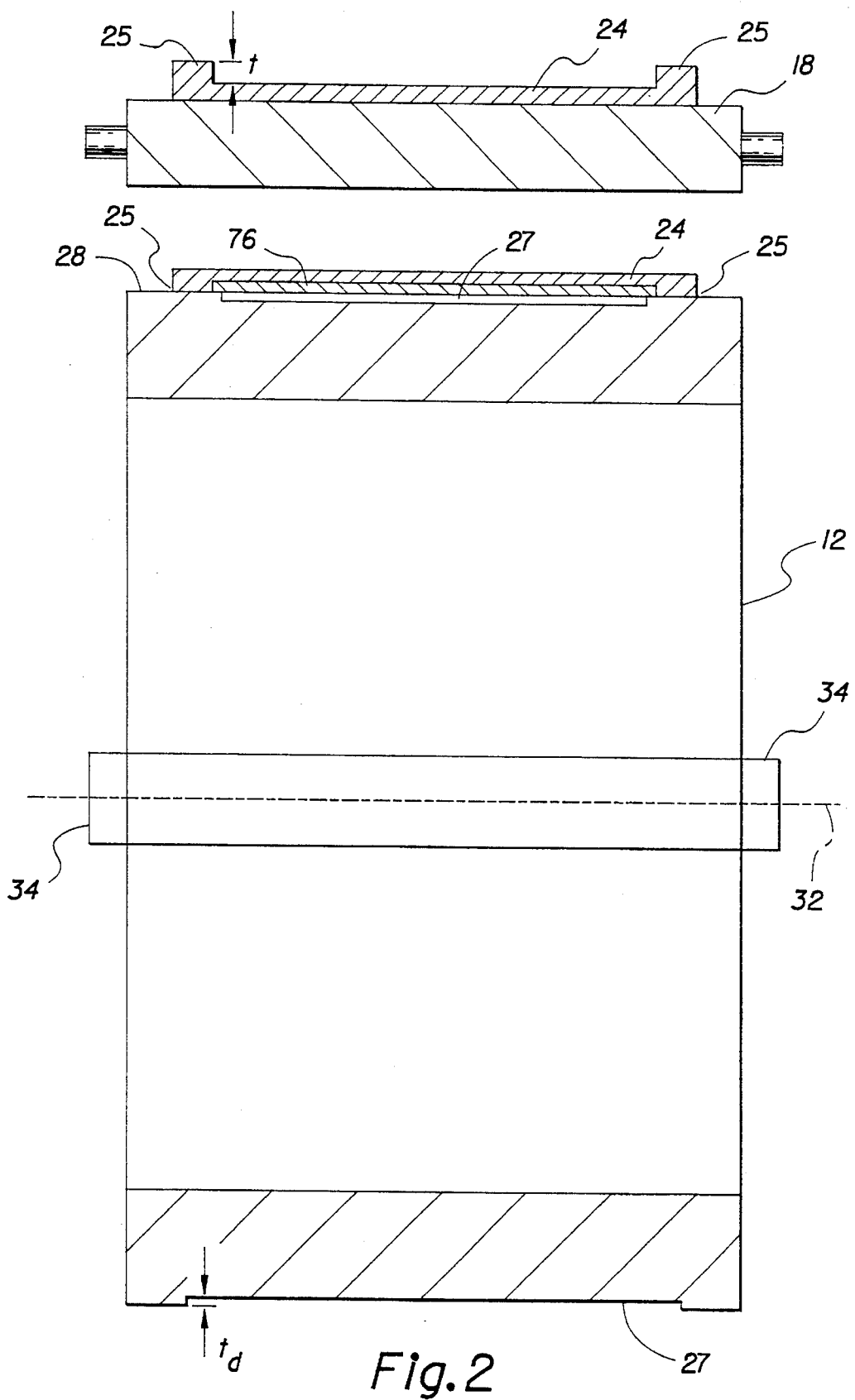
FIG. 2 is a cross-sectional view taken along line 2—2 of FIG. 1 illustrating the relationship between the filmstrip, the drive belt and surface of the drum.

Heating means are provided for heating of the cylindrical heating drum 12 to the desired temperature. In the particular embodiment illustrated a radiant heating rod 34 is disposed along the axis 32. Preferably, as shown in FIG. 2, the heating rod is continuous for at least the distance the filmstrip extends across the drum 12 so that substantially uniform heating of the drum will be effected in the area of contact of the filmstrip. In addition to providing uniform heating, placement of the heating rod 34 within the drum 12 provides for a compact design. The heating rod 34 is activated for appropriate period intervals and for desired time periods so as to impart a desired temperature to the drum 12. Appropriate sensors and mechanisms may be provided, not shown, to control turning on and off of the radiant heater rod 34 so that the temperature of the heating drum 12 along its outer surface 28 may be properly controlled. Any well known technique, as customarily used in the prior art may be utilized for this purpose. For example, a sensor may be secured to the outer surface 35 of the drum 12 which will monitor the temperature of the drum 12 and thereby control the turning on and off (or adjusting the amount of power) of the radiant heater 34. However, it is to be understood that any monitoring and control technique may be utilized and any type heater be used to provide the heat. For example, and not by way of limitation, contact resistant heating elements may be applied to the inner surface of the drum 12.

The hollow drum 12 is made of a heat conductive material, preferably metal. In the embodiment illustrated, drum 12 is made of steel and has a wall thickness of about 0.75 inches (1.905 cms). The drum is designed to act like a heat reservoir such that the temperature of the drum will drop significantly when the film is brought into contact with the drum. The outer surface of the drum 12 is provided with a thin nickel coating so as to assist in minimizing dirt contamination on to the film The belt 24 may be made of any suitable material. In the embodiment illustrated, the belt 24 is made of neoprene.

The mechanism 10 is also provided with means for cooling the filmstrip. The cooling means is similar in construction and operation to the heating means. The cooling means comprises a cylindrical hollow cooling drum 40 having an outer contact surface 42 and an inner contact surface 44 and a second plurality of rollers 46,48,50,52,54 which are associated with cylindrical cooling drum 40. The rollers 46,48,50,52,54 are designed to receive a continuous drive belt 56 and are positioned such that a second receiving pocket 58 is provided for retaining and holding the cylindrical cooling drum therebetween. The drive belt 56 and cylindrical cooling drum 40 form second film path 60 having an entrance 61, an exit 63 and a length Dc. One of the rollers 46–54 is a drive roller and is designed for rotating the belt 56 such that the drum 40 will be caused to rotate about its axis of rotation 66. In a similar manner to rollers 14–22, one of the rollers 46–54 is a drive roller and the remaining rollers are mere idler rollers. In the particular embodiment illustrated, roller 46 is a drive roller and is connected to a drive mechanism, not shown, for rotating the roller 46 in the appropriate direction as desired. Additionally, rollers 46,50 and 54 are steel rollers and are curved in the central section, whereas rollers 48 and 52 are made out of plastic or hard rubber. If necessary tensioning means may be provided for maintaining the tension of the belt 56 so as to firmly hold the drum 40 appropriately in position. A guide member 68 is provided and extends between the exit 33 of film path 30 and entrance 31 of film path 60 for guiding a filmstrip from the exit 33 of the first film path 30 to the entrance 61 of the second film path 60 as is discussed in greater detail later herein.

The mechanism 10 is further provided with a supply mechanism 70 for delivering individual filmstrips from a plurality of film cartridges 72. The cartridges 72 are of the thrust type, and include a spool around which is wound a filmstrip 76. Rotation of the spool will cause the filmstrip 76 to be thrust out of the cartridge or rewound back into the cartridge as is described in U.S. Pat. No. 4,933,893. In the embodiment illustrated the supply mechanism includes a supply turret 78 which has a plurality of nest 79, each nest designed for holding and retaining a single thrust film cartridge 72. In the particular embodiment, six nests 79 are provided, however, any desired number of nests 79 may be provided. The mechanism 70 further includes a delivery station 82 where a film cartridge 72 is positioned so that the spool 74 will engage a drive mechanism (not shown) for rotating the spool 70 causing the filmstrip 76 to be thrust out of the cartridge 72. Thus, as illustrated, when a film cartridge 72 is positioned at the delivery station 82, rotation of spool will cause the leading edge of the filmstrip to be delivered to the entrance 31 of the film path 30. In the particular embodiment illustrated a slack box 84 is provided between the delivery station 82 and entrance 31 so that the filmstrip may be temporarily stored as the filmstrip is being fed into the film path 30 as described in further detail later herein. When the filmstrip has been thrust out such that only the trailing end is secured to the spool a detached mechanism is used to disengage the trailing edge of the filmstrip 76 from the spool 74 of the cartridge 72. A more detailed description of a suitable detach tool and its operation is described in copending U.S. patent application Ser. No. 08/098,112, filed Jul. 27, 1993, entitled "A Tool and Method For Detaching a Trailing End Portion of a Filmstrip From Atop at Least The Hook Atop A Ramp on a Film Spool Inside a Film Cartridge" by Thomas C. Merle, Dale W. Ryan, and David L. Rowden, which is owned by the assignee of the instant application and which applicants hereby incorporate by reference in its entirety. However, it is to be understood that any appropriate mechanism may be used to detach the filmstrip 76 from the cartridge 72. After the entire filmstrip 76 has been delivered out of the cartridge 72, the supply turret rotates so as to provide another cartridge 72 at the delive station 86 and thereby permit the filmstrips therein to be delivered to the entrance 31 in a similar manner. This procedure is repeated until all the filmstrips have been emptied from the cartridges 72. The empty cartridges are then removed and replaced by full cartridges.

The apparatus 10 is also provided with a take-up mechanism for taking up the filmstrips after they have gone through the decurling operation. In particular, the take-up mechanism 90 includes a take-up turret 92 having a plurality of nests each designed to receive an empty film cartridge 72. Take-up station 96 is provided for receiving filmstrips that have exited the second film path 60. While in the particular embodiment illustrated six (6) nests 94 for receiving empty film cartridges 95, any desired number of nests 94 may be provided. A reattached mechanism 100 is provided adjacent the exit 63 of the second film path for re-attaching of the end of the filmstrip to a cartridge 95 at the take-up station 96. In the particular embodiment illustrated the cartridge 95 is designed to be an intermediate cartridge for temporary storage of the film. The film may be secured to the cartridge in any desired manner In order to more fully understand the present invention a brief description of its operation will now be discussed. Initially the supply turret is filled with an appropriate number of film thrust cartridges 72 are provided in nests 79 and the cartridges 72 are sequentially then positioned at the delivery station 82. The filmstrip 76 in the thrust cartridge 72 at delivery station 82 is thrust out and is fed to the entrance 31 of the first film path 30. As illustrated, the filmstrip 76 is guided along to the entrance 31 by an appropriate guide 91 to the entrance 31. Once the filmstrip 76 enters the entrance 31 it will be sandwiched between the belt 24 and adjacent drum 12. The direction of rotation of drum 12 is such that the film is being wrapped about the drum so that the filmstrip is bent in a direction opposite to that of the curl of the filmstrip. The filmstrip 76 is held firmly in position between the belt 24 and adjacent drum 12 as it is being taken along the first film path 30. Since both the belt 24 and drum 12 are moving in the same direction and at the same speed, there is no relative motion there between. Typically, the filmstrip 76 will be thrust out of the cartridge at a speed greater than which the drum is rotating. Thus, the excess length of filmstrip 76 will be retained within the slack box 84 until the drum and belt are able to pick up the filmstrip 76 and take it through the film path 30. This slack box also allows time for the detached mechanism 88 to detach the filmstrip after the filmstrip has reached the end of its thrusting in the cartridge. After the filmstrip has been detached, the supply turret will rotate so as to present the next film thrust cartridge 72 at the delivery station. Thereby the spool of the next cartridge will be engaged by the thrust drive mechanism so as to thrust the filmstrip out of the cartridge. This procedure is continued until all the filmstrips have been removed from all the cartridges. As filmstrips are being removed from the cartridges, other filmstrips are being transported along the film paths 30 and 60 and are being heated by the drum until it reaches the exit 33. The size of drums 12 is selected such that it will not adversely affect the film and allow a sufficient amount of heat to be transferred to the filmstrip so that the curl can be removed therefrom to the point where the film can be easily handled in the remaining photofinishing process. The temperature impact to the filmstrip will vary depending upon the temperature of the drum 12, the rational speed of the drum 12 and heat transfer property of the film. In the particular embodiment illustrated the drum has an outer diameter OD of about 150 mm (6 inches) and is being rotated at a velocity so t at the filmstrip is in contact with the drum 12 for a time provided in the range of about 4–16 seconds. In the embodiment illustrated, the drum is rotated at revolutions per minute so as to impart a linear with velocity to the filmstrip of about 1.0 inches per second (2.54 cms). The heating drum 12 is maintained at a temperature appropriate to provide the desired amount of heat transfer to the filmstrip. The temperature of the outer surface 28 of the drum 12 is maintained below the glass transition temperature of the film base from which the filmstrip is made. In the embodiment illustrated, the film is made of polyethylene terephthalate which has a glass transition temperature of about 100° C. The temperature of the outer surface is preferably in the range of 70°–95° C. After the filmstrip 72 has been heated it will then enter the entrance 61 of the second film path whereby the filmstrip is cooled. Then the filmstrip 72 will be guided to the entrance 61 of film path 60 by the guide member 68. The size and shape of the cooling drum 40 is preferably identical to that of the heating drum 12. However, the size of drum 40 may be varied if desired in which case it will be necessary to match the linear velocity of the filmstrip in film path 60 to that of film path 30 so that the filmstrip will continue along the film path without the possibility a jam between the two successive filmstrips.

Referring to FIG. 2, the belt in the preferred embodiment illustrated extends across the width of the filmstrip 76 so that a substantially uniform pressure is applied against the filmstrip 12.

When the filmstrip 76 exits the second film path 60 at exit 63 the filmstrip 76 is reattached to an empty film cartridge 95. It is to be understood that various mechanisms may be used for re-attachment of the filmstrip 76 to the cartridge 95. As each filmstrip 76 is inserted into an empty film cartridge 95 the appropriate mechanism unit is used to rewind the film once it has been attached to the spool so as to take up the filmstrip thereon. Once the filmstrip 76 has been totally loaded on to the empty film cartridge 95 the take-up turret will be rotated so that the next empty film cartridge 95 is provided at the take-up station for receiving the next filmstrip 76.

The cooling drum is designed simply to cool the filmstrip to a desired predetermined temperature. In the particular embodiment illustrated the cooling drum is designed to cool the filmstrip to a temperature in the range of 35° C. to 40° C. However, the temperature that the filmstrip is cooled will vary depending upon the physical characteristics of the filmstrip.

Figure 3:
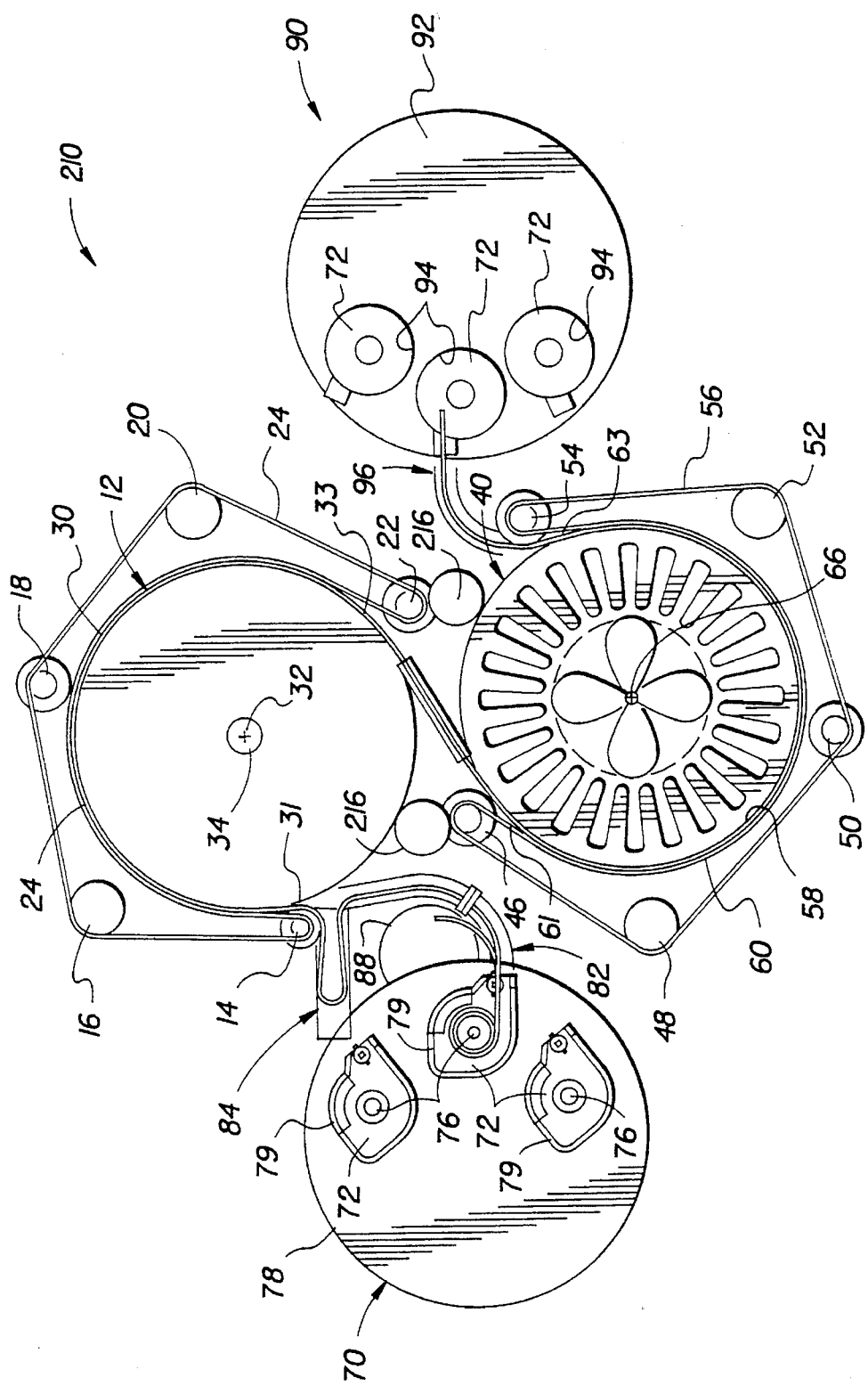
FIG. 3 is a schematic diagram of a modified transport and decurling apparatus made in accordance with the present invention.
Figure 4:
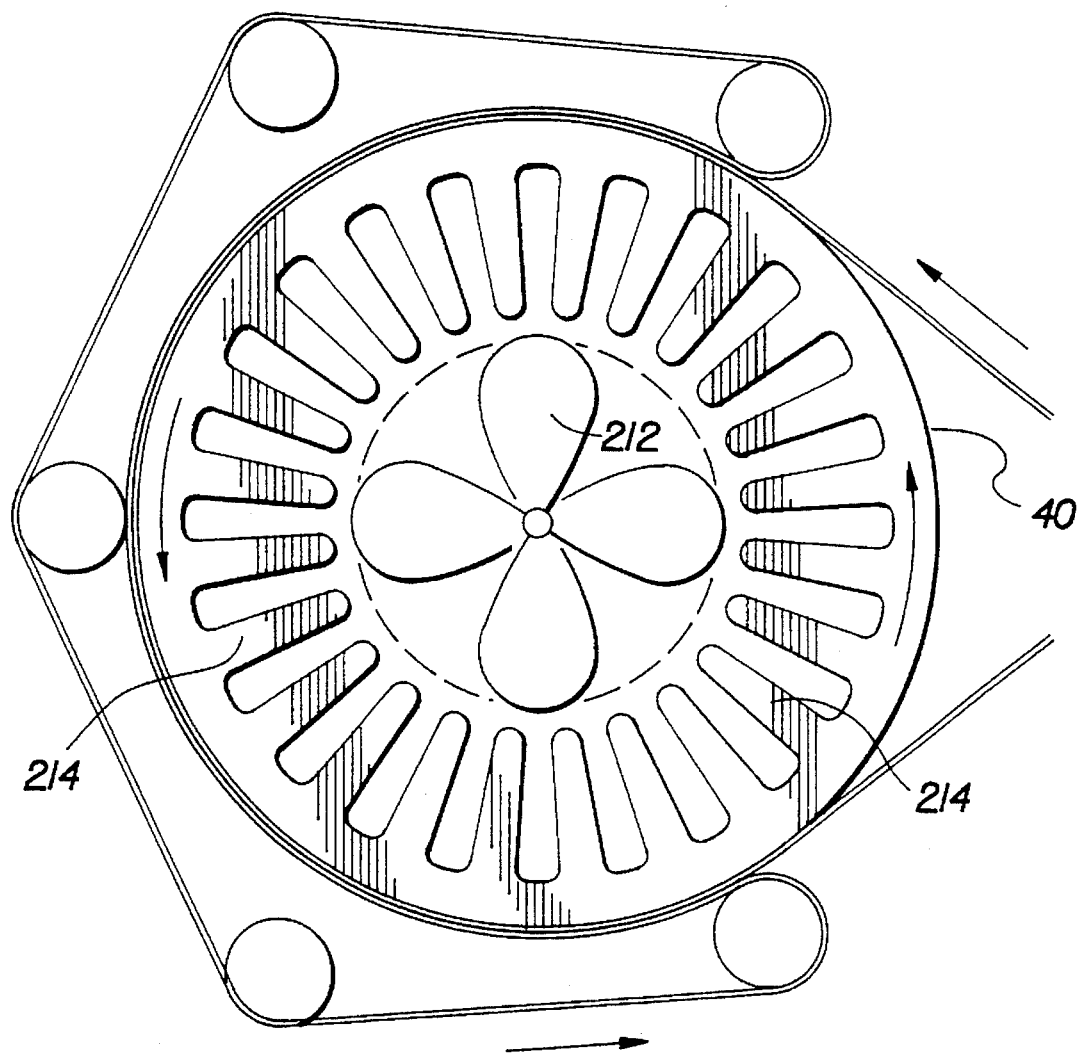
FIG. 4 is a enlarged view of the cooling drum of the apparatus of FIG. 3.

Refer to FIGS. 3 and 4, a modified mechanism 210 made in accordance with the present invention is illustrated. Mechanism 210 is similar to that mechanism 10 illustrated in FIG. 1, like numerals indicating like parts. In this embodiment the cooling drum 40 is provided with additional means for cooling of the drum. In particular, the inner surface of the drum 40 is provided with a plurality of cooling fins 214 which extend radially inward toward the axis of rotation 66. A fan 212 is provided for drawing a cooling medium, for example, air across the fins so as to maintain the drum at a desired temperature. If desired a refrigerated cooling mean may be passed across the cooling fins to further enhance the cooling capabilities of the cooling drum 60. Also in this embodiment there is provided cleaning rollers 216 for respectively cleaning of the heating drum 12 and cooling drum 40.

In addition to providing a mechanism and for decurling of the filmstrip, the present invention provides a unique method and apparatus for transporting of the film along a film path from a first point to a second point. The advantage the present system provides is that very low tolerance is required with regard to the position of the drum, rollers and belt. All that is required is that the belt be sufficiently tight so as to hold the respective drum in position so that the film can be captured between the belt and adjacent drum for transporting of the film along the film path. It should be understood that various configurations and hookups of various transporting drum assemblies may be provided so as to transport film from the first location to a second location.

In the particular embodiment illustrated, the mechanism 10 is shown decurling a filmstrip made of polyethylene terephthalate, however, the mechanism 10 may be used to decurl filmstrips made of other materials such as acetate, polyethylene naphalate, etc. and film in other formats, e.g. microfiche, movie film, etc. When other materials are decurled, the temperature of the heating drum and cooling drum may need to be adjusted to the physical properties of the material. Preferably, the heating drum is maintained at temperatures closely below the glass transition temperature of the material and for a time period sufficient to relax the core set in the film.

Figure 5:
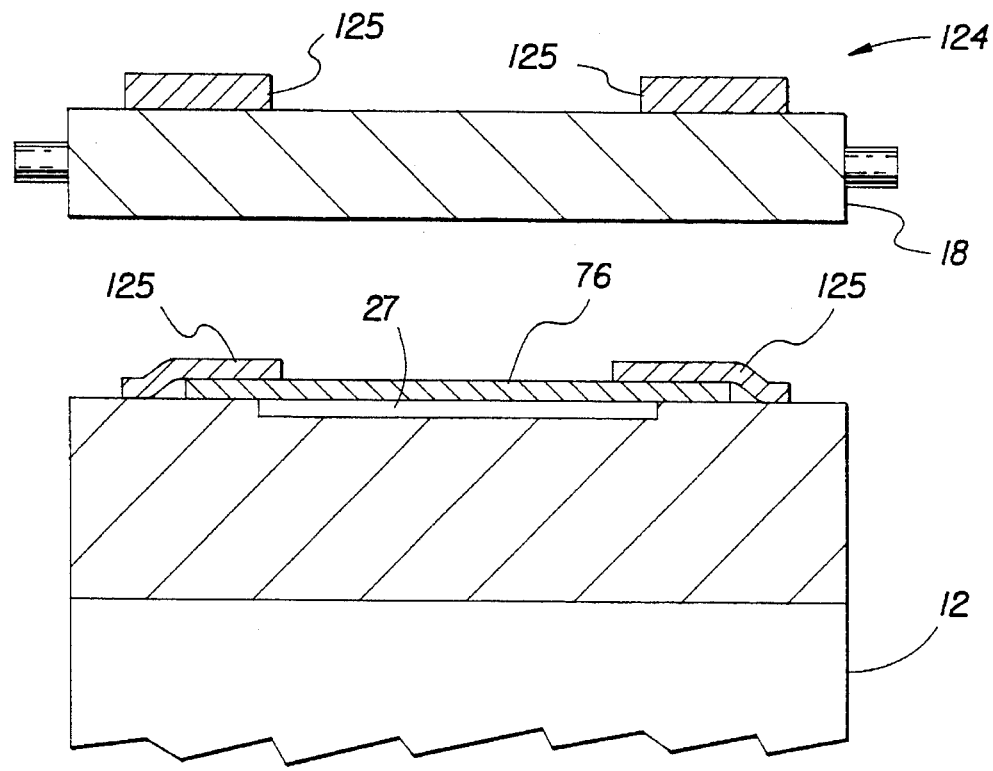
FIG. 5 is a schematic diagram of a portion of the drum illustrating a modified belt design.

In the preferred embodiment illustrated, the belt 24 is single belt which extends continuously across the film and is provided with steps 25 at it lateral edges. However, the belt may take other configurations. Referring to FIG. 5, there is illustrated a modified belt 124 which comprises two separate strips 125 which cover the lateral edges of the film.

Figure 6:
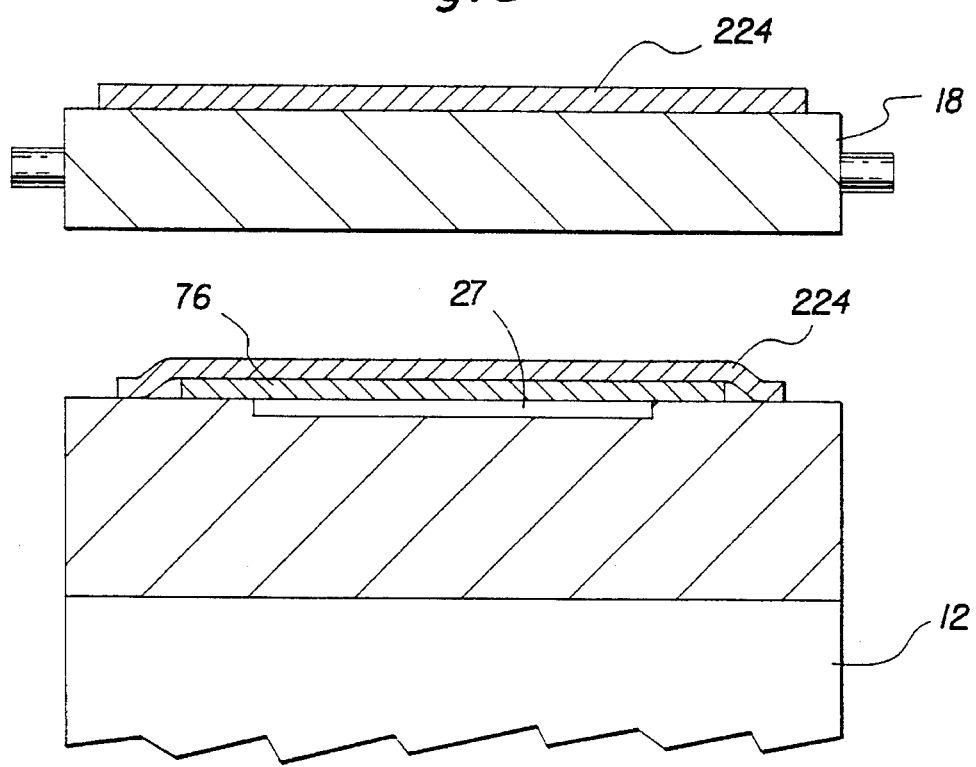
FIG. 6 is a schematic diagram of a portion of the drum illustrating yet another modified belt design.

Referring to FIG. 6, there is illustrated yet another modified belt 224 suitable for use with the present invention. In this embodiment the belt 224 does not have step sections at the lateral at the edges of the belt as is present in the embodiment illustrated in FIGS. 1–4.

Figure 7:
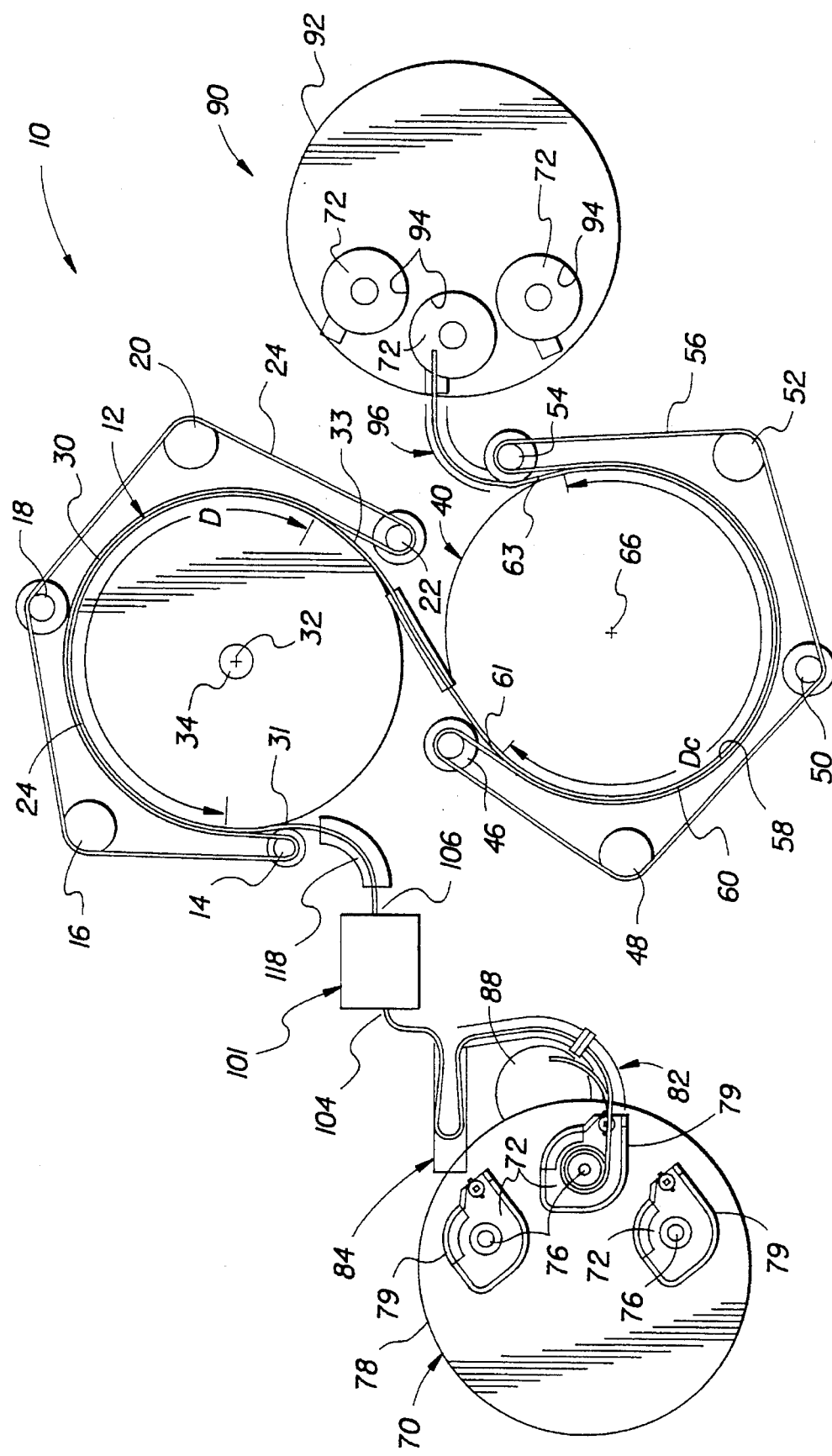
FIG. 7 is a schematic diagram of a modified apparatus made in accordance with the present invention

Referring to FIG. 7 there is illustrated a modified apparatus made in accordance with the present invention. This embodiment is similar to the embodiment of FIGS. 1–4, like numerals representing like parts, except that the film strip 76 is predried by a drier 101 prior to it being decurled. FIGS. 8, 9 and 10 illustrate in greater detail the drier 101. The drier 101 is provided with a drying chamber 102 having an film entrance 104 and film exit 106. The chamber 102 has width W which is slightly greater than the width of the filmstrip 76 and a thickness $T_f$. A film track 108 is provided for confining the lateral edges of the filmstrip so as to control the position of the filmstrip 76 as it passes through the chamber 102. In the embodiment illustrated the film track 108 has a thickness $T_r$ of about 0.030 (0.0762 cms) and is designed to receive a filmstrip 76 having a thickness of about 0.005 inches (0.0127 cms). Drying air enters the drying chamber 102 through inlet ports 110 from plenum 111 and exits chamber 102 through outlet port 112. Heated air is introduced into plenum 111 through inlet 115. In the particular embodiment illustrated the air is introduced into plenum 111 at a temperature of about 150° F. However, the temperature of the drying air may be varied to any desired temperature. The heated air is such that the relative humidity of the emulsion is substantially reduced, preferably to about 10% or less. It is to be understood that any drying technique may be utilized. The film leaves drier and enter track 118 which directs the filmstrip 76 to film path 30.

The present invention provides a method and apparatus for decurling a film and/or transporting of a film along a path that provides uniform heating and cooling and is relatively economic to produce and reliable.

It is to be understood that various changes and modifications may be made without departing from the scope of the present invention. The present invention being limited by the claims set forth below.

Parts List

10 . . . apparatus/mechanism
12 . . . heating drum
14,16,18,20,22 . . . rollers
24 . . . drive belt
25 . . . steps
26 . . . receiving pocket
27 . . . undercut section
28 . . . outer surface
30 . . . film path
31 . . . entrance
32 . . . axis
33 . . . exit
34 . . . heating rod
40 . . . cooling drum
42 . . . outer contact surface
44 . . . inner contact surface
46,48,50,52,54 . . . rollers
56 . . . drive belt
58 . . . receiving pocket
60 . . . second film path
61 . . . entrance
63 . . . exit
66 . . . axis of rotation
68 . . . guide member
70 . . . supply mechanism
72 . . . film cartridges
74 . . . spool
76 . . . filmstrip
78 . . . supply turret
79 . . . nest
82 . . . delivery station
84 . . . slack box
86 . . . delivery station
88 . . . detach mechanism
90 . . . take-up mechanism
91 . . . guide
92 . . . take-up turret
94 . . . nests
95 . . . empty film cartridges
96 . . . take-up station
100 . . . reattached mechanism
101 . . . drier
102 . . . chamber
104 . . . entrance
106 . . . exit
108 . . . film track
110 . . . inlet ports
111 . . . plenum
112 . . . exit port
115 . . . inlet
118 . . . film track
124 . . . modified belt
125 . . . separate strips
210 . . . modified mechanism
212 . . . fan
214 . . . cooling fins
216 . . . cleaning rollers
224 . . . modified belt

We claim:

1. A method for decurling a strip of photosensitive material comprising the steps of:

providing a heating drum of a predetermined temperature;

placing a strip of photosensitive material against the surface of the drum such that the curl in the photosensitive material is placed against the drum in the opposite direction from the curvature of the drum and in such a manner that substantially no sliding occurs between the strip of photosensitive material and said drum; and providing pressure against at least a portion of the photosensitive material on the side of said photosensitive material opposite said drum such that the photosensitive material is in contact with the drum, said pressure being provided by a belt, said belt forming a receiving pocket for holding and retaining said drum such that when said belt is moved, said drum is rotated about its axis of rotation and the photosensitive material will be moved along the film path.

2. A method of transporting a filmstrip along a predetermined path in an apparatus comprising at least one substantially cylindrical drum, a plurality of rollers associated with said drum and a belt forming a closed loop about said plurality of rollers, said plurality of rollers being positioned at predetermined locations so as to form a receiving pocket for holding and retaining said drum and forming a film path between said belt and said drum about at least a portion of the circumference of said drum, at least one of said plurality of rollers being a drive roller, comprising the steps of:

rotating said drive roller so as to cause the belt to move in a predetermined direction for rotating the drum about its axis and moving the filmstrip along the film path formed between said drum and said belt; and introducing said filmstrip to the entrance of said film path that the filmstrip will be moving along said film path.

3. A method according to claim 1 wherein said heating drum is hollow, further comprising the steps of providing a heater within said hollow drum for heating of said heating drum.

* * * * *